R. W. WELTY.
PNEUMATIC CLUTCH CONTROL.
APPLICATION FILED OCT. 3, 1913.
1,133,206.
Patented Mar. 23, 1915.
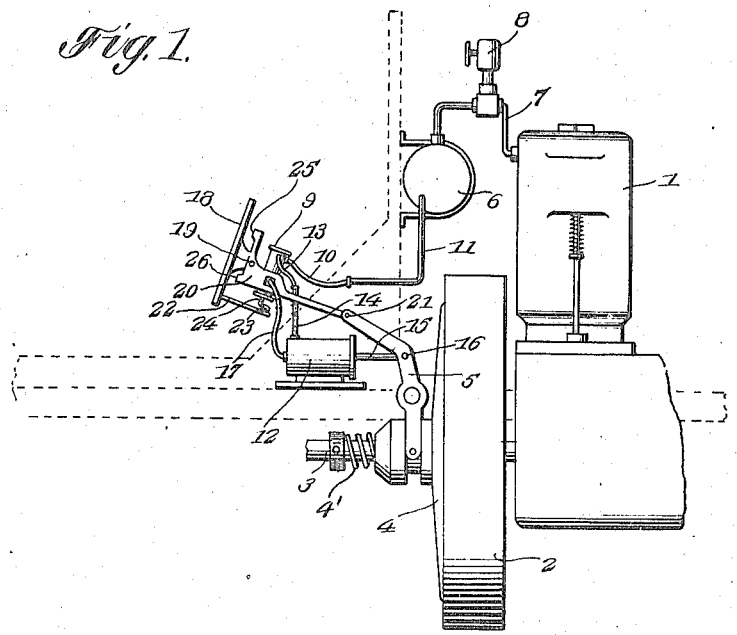
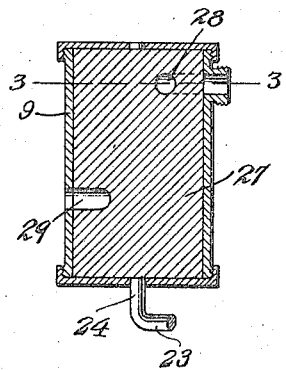
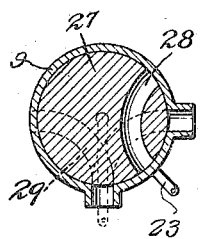
Witnesses
J. H. Crawford.
R. M. Smith.
Inventor
R. W. Welty,
By Victor J. Evans
Attorney

UNITED STATES PATENT OFFICE.

RUFUS W. WELTY, OF SAN FRANCISCO, CALIFORNIA.

PNEUMATIC CLUTCH CONTROL.

1,133,206. Specification of Letters Patent. Patented Mar. 23, 1915.

Application filed October 3, 1913. Serial No. 793,244.

*To all whom it may concern:*

Be it known that I, RUFUS W. WELTY, a citizen of the United States, residing at San Francisco, in the county of San Francisco and State of California, have invented new and useful Improvements in Pneumatic Clutch Controls, of which the following is a specification.

This invention relates to pneumatic clutch controlled mechanism for automobiles, motor trucks and other motor propelled vehicles, the object of the invention being to produce simple and reliable mechanism controlled by air pressure for throwing out and releasing the clutch which forms the connecting link between the shaft of the engine and the drive shaft of the machine, requiring very little exertion on the part of the operator.

A further object of the invention is to retain the ordinary mechanical means for operating the clutch so that the pneumatic controlling means may be used in connection therewith thus enabling the mechanical device to be used in an emergency or in case the pneumatic control should get out of order for any reason.

With the above and other objects in view, the invention consists in the construction, combination and arrangement of parts, as will hereinafter be more fully described, illustrated and claimed.

In the accompanying drawings: Figure 1 is a view in side elevation of a sufficient portion of an automobile adjacent to the clutch and engine to illustrate the manner in which the present invention is carried out. Fig. 2 is a detail longitudinal section of the three-way valve. Fig. 3 is a detail cross section through the same on the line 3—3 of Fig. 2.

Referring to the drawings 1 designates one of the cylinders of an automobile engine, 2 the fly-wheel fast on the engine shaft, 3 the driving shaft of the machine, 4 the usual clutch which coöperates with the rim of the fly-wheel 2, and 5 the clutch operating lever which is used to press the clutch 4 away from the fly-wheel 2, it being understood that the clutch 4 is held in engagement with the fly-wheel by means of one or more expansion springs.

In carrying out the present invention I employ a compressed air cylinder 6 to which air is led from one of the cylinders 1 by means of a pipe 7, the exhaust gas under pressure leaving the cylinder 1 and passing through said pipe 7 into the tank 6 in which it is stored under pressure. Located in the pipe 7 between the engine and the tank 6 is a combined safety and regulating valve 8 which operates to relieve excessive pressure and when the tank 6 becomes charged to its limit, the safety valve 8 opens automatically to allow excess pressure to pass outward therefrom to the atmosphere.

9 designates a three-way valve casing extending from which is a receiving pipe 10 which is flexible for a purpose hereinafter described, said flexible pipe 10 being connected to another pipe 11 leading out from the pressure tank 6, the pipes 10 and 11 serving to carry the pressure from the tank 6 to the three-way valve casing 9. Another pipe leads from the three-way valve casing 9 to a cylinder 12, said pipe comprising a flexible section 13 and another section 14 which may be of metal. Within the cylinder 12 is a piston, the rod 15 of which is connected pivotally to the clutch lever at 16. 17 designates another flexible return pipe leading from the cylinder 12 back to the three-way valve 9.

18 designates a rocking pedal which is pivotally connected at 19 to the main clutch operating member 20 which is slidingly supported on the machine frame and pivotally connected at 21 to the clutch lever 5 for the purpose of operating the latter by foot power alone. The valve casing 9 is fastened to and carried by the member 20. Extending from the lower end of the pedal 18 is a rod 22 which connects with a short arm 23 on the stem 24 of the three-way valve body contained in the valve casing 9 thus enabling said valve to be operated by rocking the pedal 18.

From the foregoing description it will now be understood that when the pedal 18 is rocked in one direction, the three-way valve is turned to allow the pressure to pass from the tank 6 to the cylinder 12 causing the piston rod 15 to operate the clutch lever 5 and throw out the clutch. When the pedal 18 is rocked in the opposite direction, the three-way valve 9 is reversed as to its position, thereupon cutting off the further supply of pressure to the tank 6 and allowing the compressed air to escape from said cylinder through the return pipe 17 and three-way valve to the atmosphere. Should the pneumatic control get out of order for any reason, the flexible pipes forming part of the pneumatic control, permit the pedal 18 to be thrust forward so as to mechanically operate the clutch lever 5 and admit of the throwing out and throwing in of the clutch in the same manner in which said operation is now carried out in automobiles of the present day.

25 and 26 designate stops for limiting the rocking movement of the pedal 18 in opposite directions.

The valve body indicated at 27 is provided with two passages 28 and 29 extending therethrough and arranged at different points in the length of the body and one of said passages taking care of the air passing from the compressed air tank to the cylinder and the other passage taking care of the air released from the cylinder to the atmosphere by means of the pipe connections above referred to.

The mechanism hereinabove described may also be used for operating the brakes of an automobile or similar vehicle.

What I claim is:—

1. Pneumatic clutch control for motor propelled vehicles, comprising a clutch operating lever, a rocking pedal, a clutch lever operating element interposed between and connecting said pedal and clutch lever, a compressed air cylinder and piston for operating said lever, a pressure tank, a three-way valve carried by said clutch lever operating element and adapted to be operated by said pedal, and air connections between said valve and the tank and cylinder.

2. Pneumatic clutch control for motor propelled vehicles, comprising a clutch operating lever, a compressed air cylinder and piston for operating said lever, a pressure tank, a three-way valve, a pipe leading from said tank to said valve, a pipe leading from said valve to said cylinder, a return pipe leading from the cylinder to said valve, a rocking pedal operatively connected with said valve, all of said pipes having flexible sections, and a clutch lever operating element interposed between and connecting said pedal and clutch lever.

In testimony whereof I affix my signature in presence of two witnesses.

RUFUS W. WELTY.

Witnesses:
MATTIE G. STIRLING,
ANNA CONNORS.